Patented Aug. 26, 1930

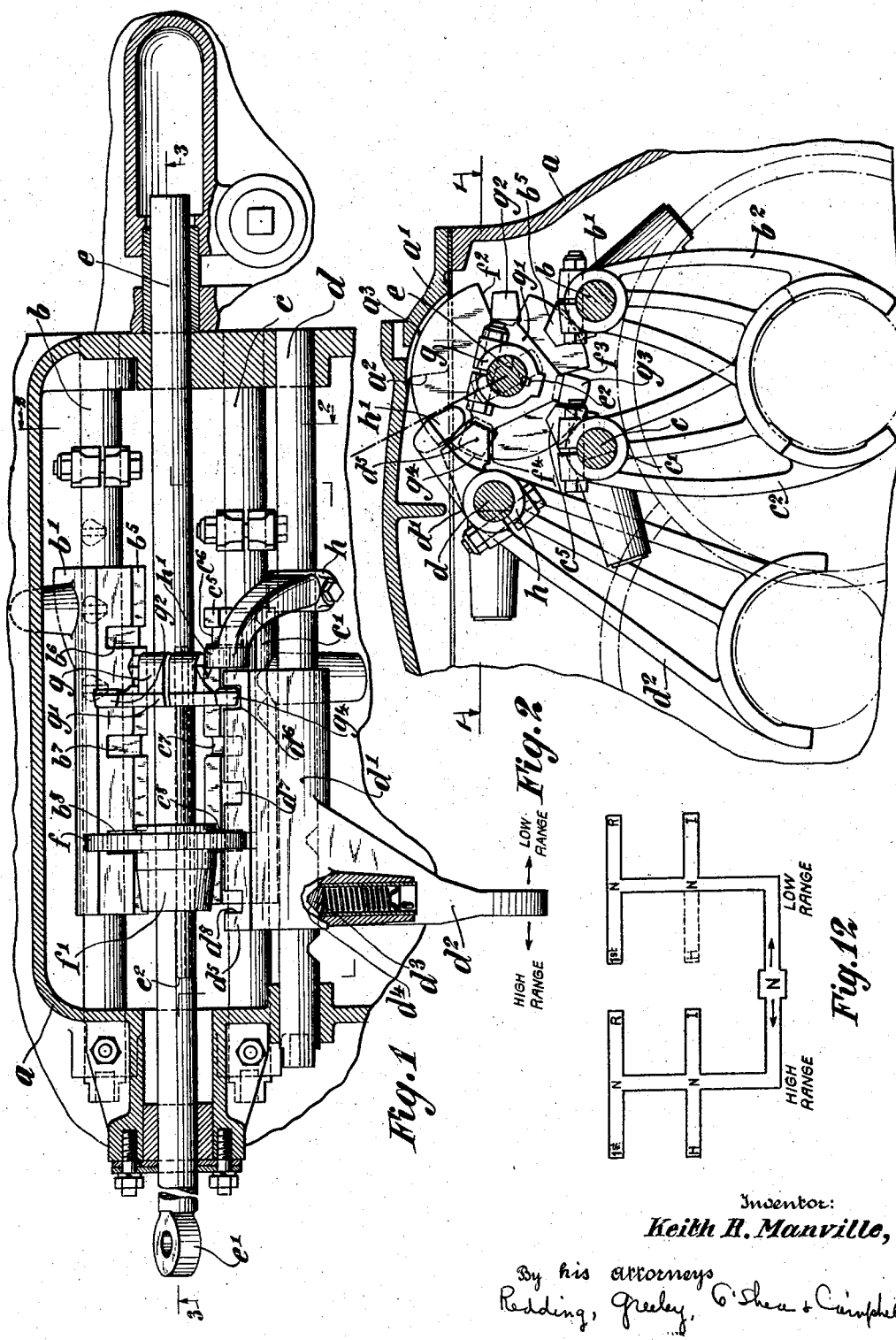

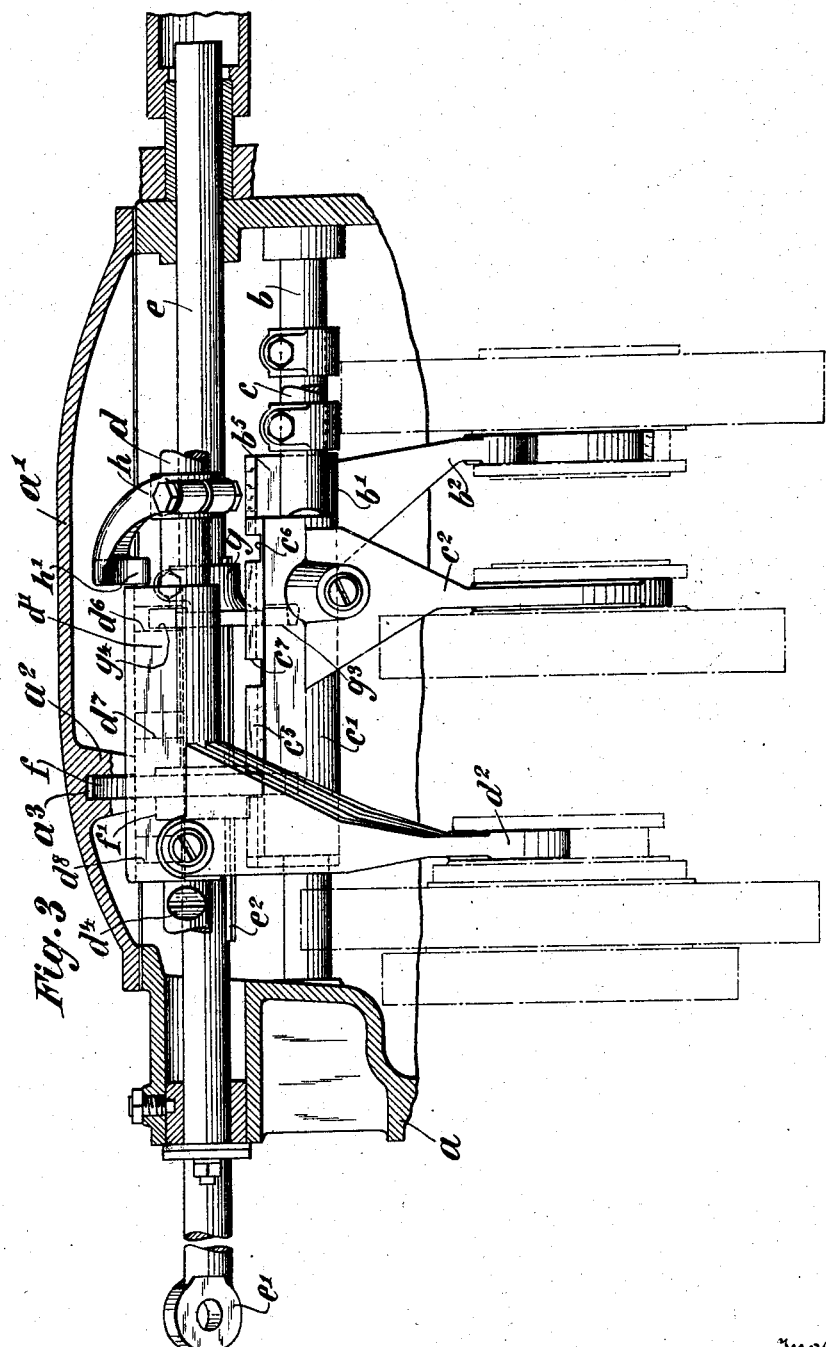

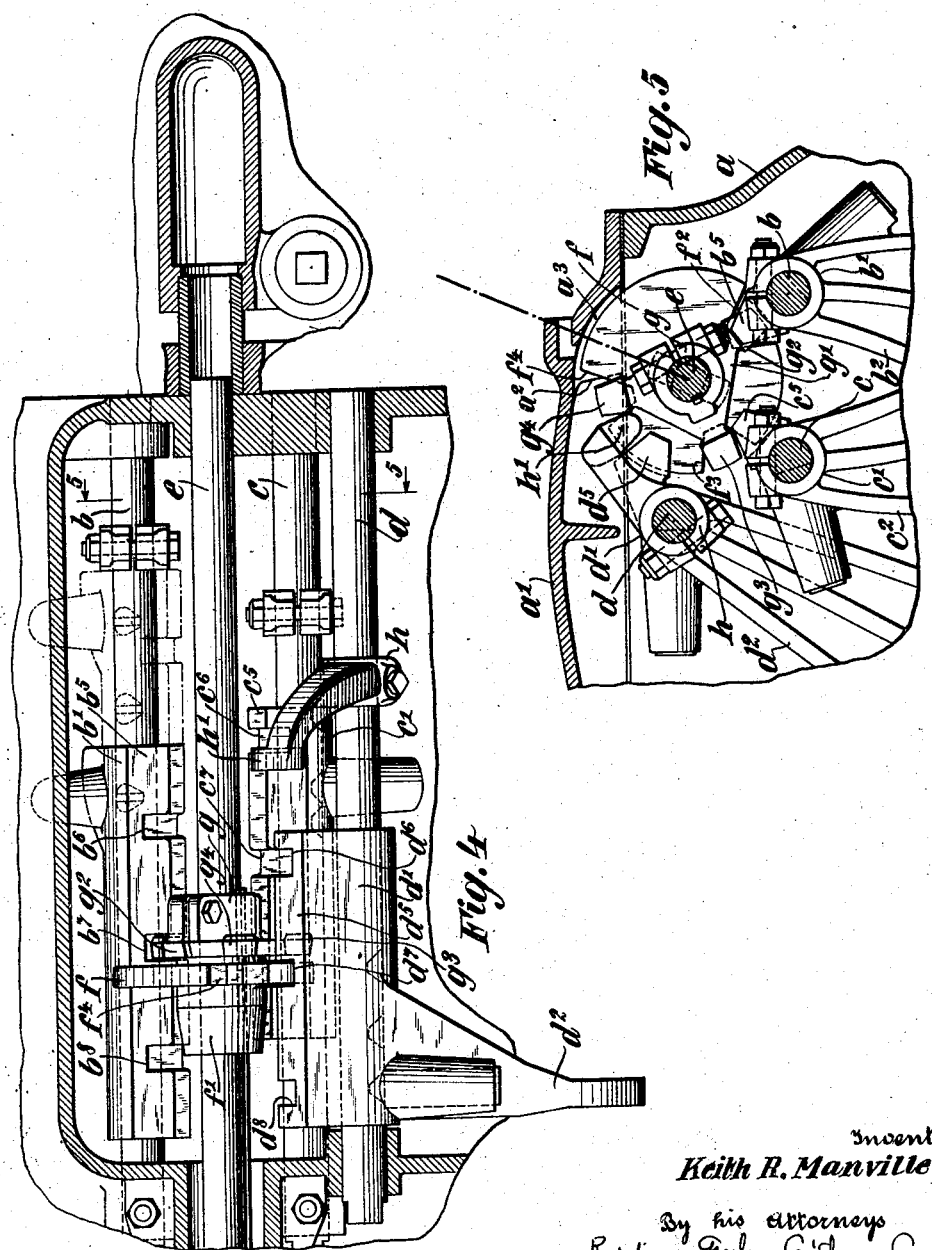

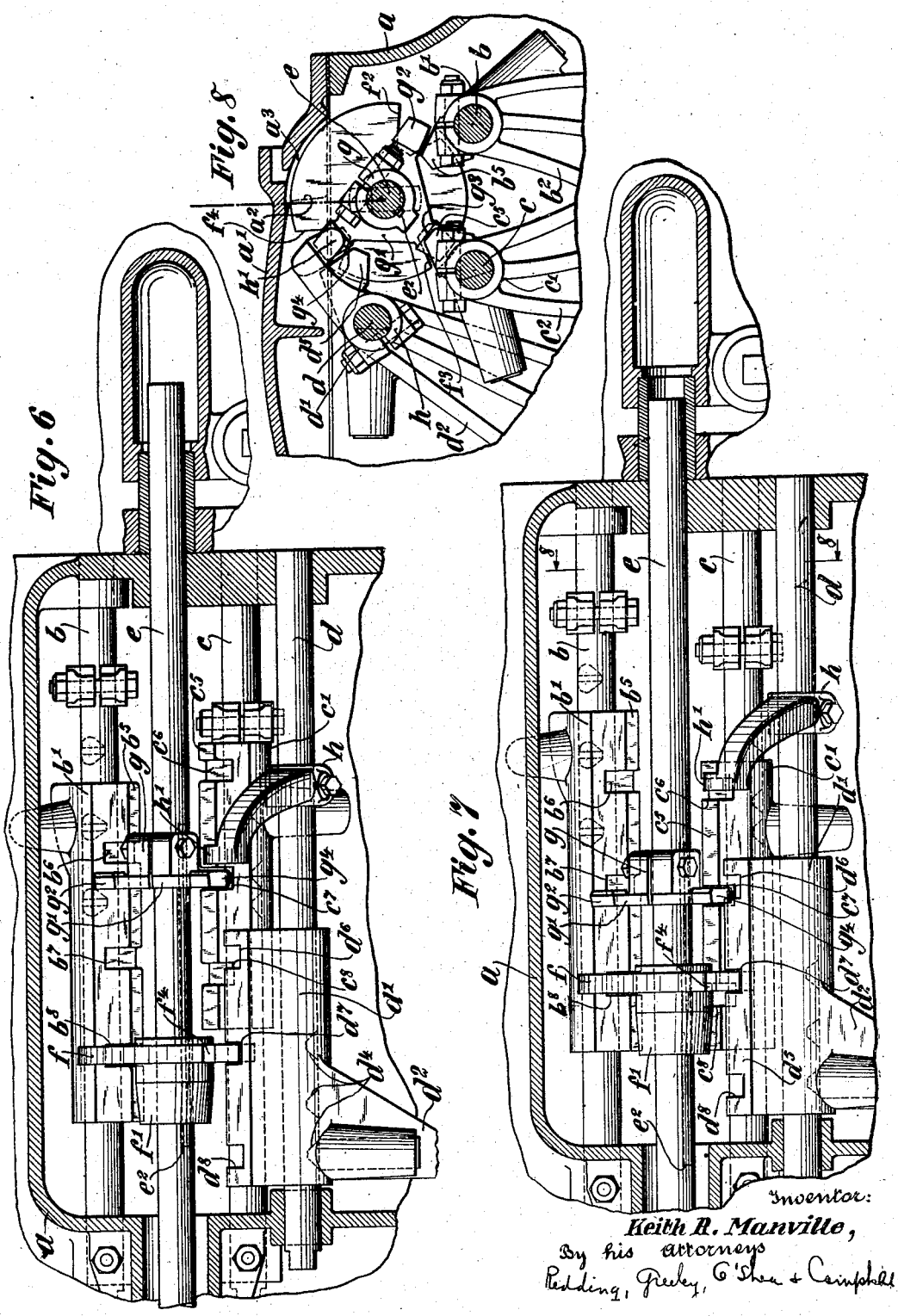

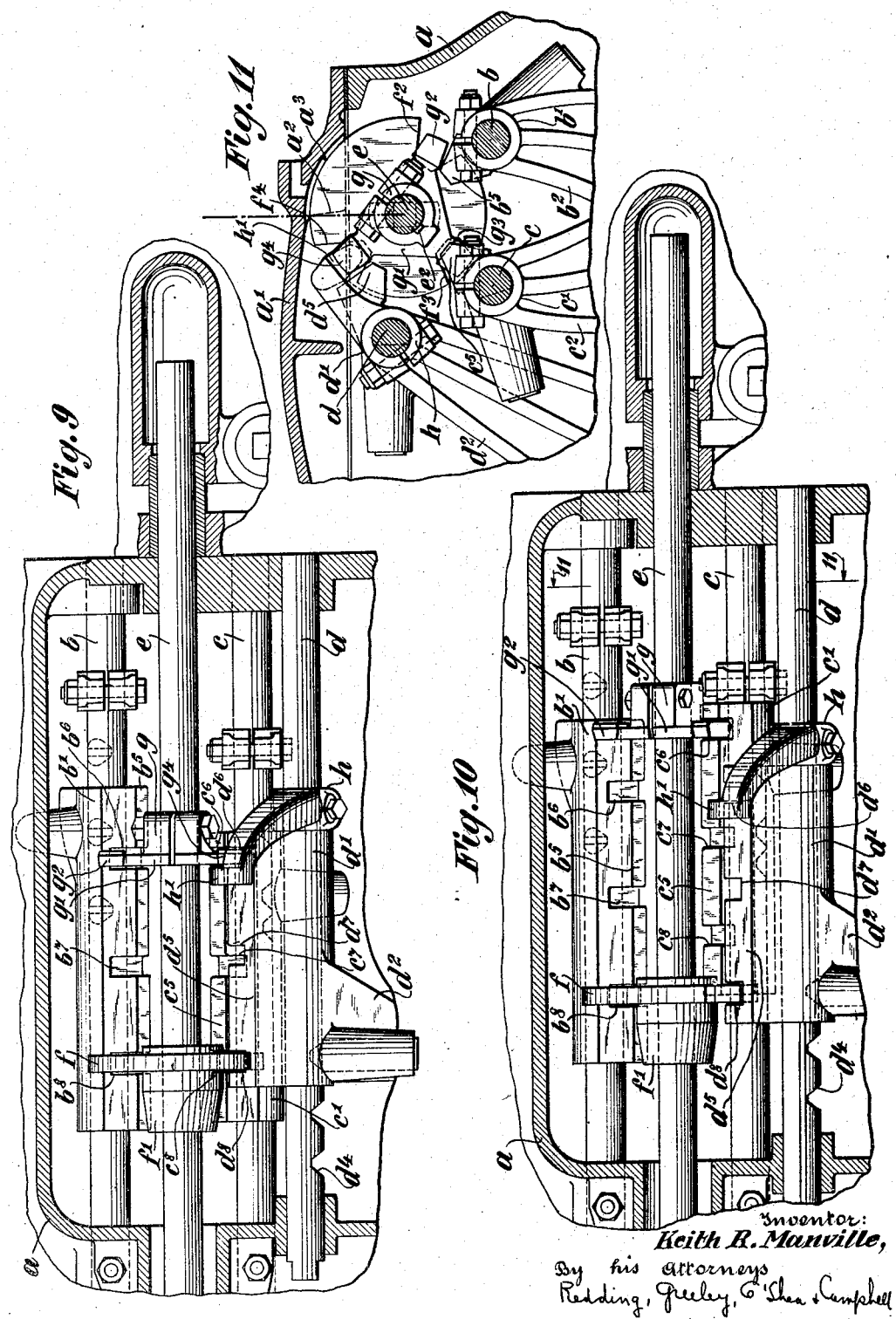

1,774,026

UNITED STATES PATENT OFFICE

KEITH R. MANVILLE, OF HIGHLAND PARK, NEW JERSEY, ASSIGNOR TO INTERNATIONAL MOTOR COMPANY, OF NEW YORK, N. Y., A CORPORATION OF DELAWARE

TRANSMISSION CONTROL

Application filed December 7, 1928. Serial No. 324,352.

The present invention relates to transmissions for vehicles and embodies an improved control for a transmission, wherein a greater number of speeds are obtained by a single shift lever without complicating the shifting movements of the mechanism and rendering the controlling device unduly complicated.

Speed change mechanisms have been designed with a view to increasing the number of gear ratios obtainable between the driving and driven members and the most common form has included a secondary transmission which provides a choice of two ratios thereby multiplying the total number of speed ratios between the driving and driven members by two. These mechanisms have been controlled by two levers, one controlling the secondary transmission, and the other the usual gear shift lever provided for controlling a three or four speed transmission. The obvious objection to the multiplicity of control levers in the control cab has rendered it highly desirable that a transmission be provided which is capable of producing the added speed changes without requiring additional control levers for the manipulation of the sliding gears of such transmission. An object of the present invention, accordingly, is to provide a control for a transmission having a greater number of speed changes than the conventional three or four speed transmission box, such control being accomplished through a single lever.

A further object of the invention is to provide a control for a transmission, wherein the number of speeds is multiplied by the inclusion of a secondary set of gears which provide an additional speed change for each position of the gears of the primary transmission. In this manner, a high and a low range of speed changes is provided in accordance with the selection of the position of the secondary gears and suitable shifting of the several gears affords a gradual and wider range of speed changes between the driving and driven elements.

It happens that in the conventional gear box to which has been added a secondary set of gears for providing an additional range of speeds, the difference between the ratios afforded by the high speed of one range and the low speed of a second range is so great that successful shifting from one range to another is seriously jeopardized.

A further object of the invention is to provide a means for locking out an undesirable speed change in one of the ranges, whereby a quiet shift is insured and a safe difference of ratios between the speed changes of all of the gears is maintained.

A further object of the invention is to incorporate, in the shifting mechanism, a locking means which positively locks all idle gears which are not shifted in a given operation, against accidental movement.

Further objects will appear as the invention is described more fully in connection with the accompanying drawings, wherein:

Figure 1 is a view in horizontal section taken on line 1—1 of Figure 2, and looking in the direction of the arrows, showing the shifter sleeves moved to a neutral position.

Figure 2 is a view in vertical section, taken on line 2—2 of Figure 1, and looking in the direction of the arrows.

Figure 3 is a vertical view in section, taken on the broken line 3—3 of Figure 1, and looking in the direction of the arrows.

Figure 4 is a view similar to Figure 1, showing the selector sleeve for the secondary gears shifted to a position corresponding to the high range of speeds.

Figure 5 is a view in section, taken on line 5—5 of Figure 4, and looking in the direction of the arrows.

Figure 6 is a view in section, similar to Figure 4, showing the intermediate and high position of the selector sleeve in the high range.

Figure 7 is a view in section, similar to Figure 4, showing the selector sleeves positioned for engaging the gears to provide the high speed in the high range.

Figure 8 is a view in section taken on line 8—8 of Figure 7, and looking in the direction of the arrows.

Figure 9 is a view in section, similar to Figure 4, showing the selector sleeves positioned in the neutral position of the low range of speeds.

Figure 10 is a view in section, similar to Figure 9, showing the selector sleeves shifted into the intermediate position of the low range.

Figure 11 is a view in section, taken on line 11—11 of Figure 10, and looking in the direction of the arrows.

Figure 12 is a diagrammatic illustration of the path of movement of the gear shift lever to effect the speed changes available in the construction described herein.

In the mechanism to be described, it is contemplated that a transmission be used similar to the transmission shown and described in the copending application of Philip E. Matthews, Ser. No. 335,759 filed January 29, 1929, wherein a secondary transmission is utilized ahead of the main transmission, the secondary transmission comprising two pairs of gears adapted to be selectively engaged to provide either the high or low range of speed changes. Between the engaging position of these pairs for the high and low ranges a neutral position is provided at which position none of the gears of the main or secondary transmissions, save the driving gear of the latter, is turned with the driving element. This is an important factor in cold weather when it frequently is difficult to start the engine, since the drag of the heavy and cold oil upon the gears is now eliminated.

The control lever, in addition to the fore and aft longitudinal movement to engage the gears, is capable of rocking movement into three positions. For convenience, these positions will be termed selector positions and are indicated in the vertical sections by heavy dot and dash lines. After having moved the selector shaft into any of these three positions, the shaft is moved axially in either a forward or rearward direction to cause a desired gear shift to be completed. The following description will set forth the specific manner of effecting the desired shifting operations more clearly.

Referring to the above drawings, $a$ indicates the top of a transmission housing provided with a cover $a'$. The gears included in the transmission are represented by thin dot and dash lines in certain of the figures to illustrate the relationship between the gears and shifting mechanism. Shifter shafts $b$, $c$ and $d$ are mounted in the housing and carry shifter sleeves $b'$, $c'$ and $d'$, respectively, each of which are formed with shifter forks $b^2$, $c^2$, and $d^2$, respectively. These forks engage the sliding gears of the transmissions and serve to move such gears into a desired position. The shifter fork $d^2$ controls the gears of the secondary transmission for the selecting of a high or low range of speeds for the changes of the gears in the primary transmission as effected by shifter forks $b^2$ and $c^2$. As shown in Figure 1, the shifter sleeve $d'$ is in a neutral position, the spring pressed detent $d^3$ engaging the intermediate notch $d^4$ on the shifter shaft $d$. Movement of the shifter sleeve $d'$ to the left as shown in Figure 1, selects the high range of gears, while movement to the right in Figure 1, selects the low range, as indicated by suitable legends.

The shifter sleeve $b'$ moves the appropriate gears to the main transmission to effect a low reverse change in accordance with the direction of movement of the sleeve while the shifter sleeve $c'$ provides the engagement of certain of the gears of the main transmission to effect the intermediate and high speed changes after a desired change of the secondary gears by the appropriate movement of sleeve $d'$ has been effected. Movement of the sleeve $c'$ to the right in Figure 1, engages the sliding gears to provide the intermediate shift of the main transmission, while movement in the opposite direction effects the high speed change. Movement of the shifter sleeve $b'$ to the left in Figure 1, effects the first or low speed change in the selected range, while movement in the opposite direction causes the reverse shift to be made. In this manner, the selector mechanism moves the various sleeves to provide the desired speed change.

Mounted at an opporpriate position in the top of the housing $a$ with respect to the shifter shafts $b$, $c$ and $d$, is a selector shaft $e$. This shaft is capable of rocking and sliding movement within the top of the housing and may be formed with an eye $e'$ for connection with the gear shift lever. The shaft is formed with a key $e^2$ and mounts a sleeve $f'$ which is formed with a locking disc $f$. The sleeve $f'$ and disc $f$ are mounted slidably upon the selector shaft $e$ but, by reason of the key, are constrained to the rocking movement of the selector shaft. The housing top $a'$ is formed with a downwardly extending lug $a^2$ which is formed with a slot $a^3$ to receive the disc $f$. In this manner, the disc $f$ is prevented from partaking of the sliding movement of the selector shaft $e$, it being only capable of rocking movement within the slot $a^3$. The locking disc is formed with notches $f^2$, $f^3$ and $f^4$ which are suitably spaced with respect to the shifter sleeves as described hereinafter.

A shifting disc $g$ is secured to the selector shaft $e$ to partake of the movement thereof, both rocking and sliding. This sleeve is formed with a flange $g'$ which is provided with shifting fingers $g^2$, $g^3$ and $g^4$, respectively. Shifting finger $g^2$ is aligned with notch $f^2$, as clearly shown in Figure 2, while the fingers $g^3$ and $g^4$ are respectively aligned with notches $f^3$ and $f^4$.

Each shifter sleeve $b'$, $c'$ and $d'$ is formed with an inwardly extending flange $b^5$, $c^5$ and $d^5$, respectively, each flange in turn being formed with notches $b^6$, $b^7$ and $b^8$; $c^6$, $c^7$, and $c^8$; and $d^6$, $d^7$ and $d^8$, respectively. The locking disc $f$ engages notch $d^7$ or $d^8$, in accordance with the position of shifter sleeve $d'$.

The locking disc also engages notches $b^8$ and $c^8$ when the shifting sleeve $d'$ is in a neutral position or while it is being shifted. In addition, the locking disc $f$ engages either of the notches $b^8$ or $c^8$ when either of the sleeves $b'$ or $c'$ are not to be moved to effect a gear change.

Shifting finger $g^2$ engages notch $b^6$ when the shifting sleeve $d'$ has been moved to a low range position, and notch $b^7$ when the sleeve has been moved to a high range position. Fingers $g^3$ and $g^4$ engage the respective notches $c^6$, $c^7$; and $d^6$, $d^7$; when the shifting disc has been moved into the corresponding above mentioned positions.

At this point, it is well to review the construction set forth above and describe its mode of operation. As previously stated, the shifter sleeves are all shown in the neutral position in Figure 1. Assuming that the gears are to be shifted progressively from the low speed position of the low range to the high speed position of the high range, selector shaft $e$ is rocked to selector position number one, as shown in Figures 1 and 2, in which position finger $g^4$ engages notch $d^6$ of the shifter sleeve $d'$ and notch $f^4$ is aligned with the flange $d^5$, thus permitting sliding movement of the sleeve $d'$. This selector position of the shaft $e$ is illustrated by the heavy dot and dash line shown in Figure 2. The selector shaft $e$ is then moved to the right as viewed in Figure 1 causing the shifter sleeve $d'$ to be moved to the position shown in Figure 9. In this position, the gears of the secondary transmission have been engaged to provide the low range of speeds while those of the primary transmission are still in neutral. After having moved the selector shaft $e$, as described above, the low and reverse shifter sleeve $b'$ is engaged by rocking the selector shaft to position number three as shown by the heavy dot and dash line in Figure 5. This selector position corresponds to the maximum rocking movement of the selector shaft in the direction opposite from that in which it is moved to engage the shifter sleeve $d'$ of the secondary transmission. Having rocked the selector shaft $e$ to the position described above, the shifter finger $g^2$ engages slot $b^6$ while the notch $f^2$ is aligned with the flange $b^5$ of the sleeve $b'$. Axial movement of the selector shaft $e$ to the right in Figure 1 engages the reverse gears to provide the reverse gear connection for the low range. Movement of the shifter sleeve $b'$ to the left as viewed in Figure 1, effects the low speed connection for low range.

From the low speed connection of the low range, the intermediate speed connection for the low range is attained by shifting the sleeve $b'$ back to the position in which notch $b^8$ is aligned with the locking disc $f$ and rocking the selector shaft $e$ to position number two which is shown in Figure 11 by the heavy dot and dash line. In this position, the finger $g^3$ engages notch $c^6$ and the notch $f^3$ is aligned with the flange $c^5$. Axial movement of the shaft $e$ to the right, as viewed in Figure 1, moves the shifter fork $c^2$ to cause the intermediate gear connection to be effected.

At this point, it is well to digress in order that an additional feature embodied in this invention may be described. As previously stated, the shift from the high speed connection of the low range to the low speed connection of the high range involves a jump between two widely varied speed ratios. The danger of this is quite apparent and in order that this connection cannot accidentally be accomplished, a locking arrangement has been provided to prevent the operator from shifting into the high speed position of the low range. In other words, the high speed position of the low range has been locked out and is never utilized in the present construction. A dog $h$ provided with a finger $h'$ is secured to the shaft $d$. The finger $h'$ projects into the path of movement of finger $g^4$ when the latter is moved to the left as viewed in Figure 1 and the selector shaft $e$ has been rocked to the position illustrated by the heavy dot and dash line in Figure 11. When the selector shaft is in this position the finger $g^4$ is aligned with the finger $h'$ and movement of the selector sleeve to the left, as viewed in Figure 1, is thus prevented. This movement is the movement necessary to effect the high speed connection in the low range of speeds, and, in this manner, this connection is positively blocked out.

Continuing with the shifting operation from the intermediate position of the low range, the sleeve $c'$ is moved to the position in which notch $c^8$ is aligned with the locking disc $f$. Selector shaft $e$ is then rocked to the position shown by the heavy dot and dash line in Figure 2 in which position finger $g^4$ engages notch $d^6$. Axial movement of the selector shaft $e$ to the left, as viewed in Figure 1, causes the shifter sleeve $d'$ to be moved through its neutral position and into the position shown in Figure 4, at which time, the secondary gears have been shifted to the high range connection. At this point, the gears of the main transmission are still in neutral and the selector shaft $e$ is rocked to the position shown by the heavy dot and dash line in Figure 5. At this time, finger $g^2$ engages notch $b^7$ while notch $f^2$ is aligned with flange $b^5$. Incidentally, the locking disc $f$ engages notches $d^7$ and $c^8$ to prevent movement of the respective sleeves $d'$ and $c'$. It should be remembered in the operation of this controlling mechanism that each of the shifter sleeves not moved to effect a desired speed change is locked from movement by the engagement of the locking disc $f$ in the appropriate notches of the several sleeves. With the shifting of finger $g^2$ engaging notch $b^7$, movement of shifting sleeve $b'$ to the left as viewed in Figure 1, effects the low speed position of the high range. Movement of the shifter sleeve in the opposite direction provides the reverse speed connection of the high range. From the low speed connection of the high range, the intermediate connection is reached by moving the selector shaft $e$ axially until notch $b^8$ is aligned with locking disc $f$ and rocking the selector shaft $e$ to position number 2 as shown by the heavy dot and dash lines in Figure 8, at which time, finger $g^3$ engages notch $c^7$ while notch $f^3$ is aligned with flange $c^5$. Sleeves $b'$ and $d'$ are now locked against movement and movement of the shifter sleeve $c'$ to the right, as viewed in Figure 1, provides the intermediate speed connection of the high range while movement of the sleeve to the left provides the high speed connection of the high range.

Suitable notches are provided on the respective shafts $b$, $c$ and $d$ to be engaged by spring pressed detents carried by each of the shifter sleeves. In this manner, the correct position of each sleeve for each shift is accurately assumed.

Figure 12 illustrates, diagrammatically, the path of movement of the gear shift lever to obtain the necessary speed changes. The many advantages inherent in the foregoing construction will be quite apparent and the simplicity of parts makes the foregoing construction readily adaptable to quantity production. By reason of the small number of parts, as well as their strong construction, the device is easily serviced and no confusion results in operating the vehicle through the greater number of speeds. While the invention has been described in connection with the accompanying drawings it is not to be limited, save as defined in the appended claims.

I claim as my invention:

1. A shifting mechanism comprising three shifter shafts, shifter sleeves mounted on each shaft and formed with shifting forks, a notch on each sleeve, a selector shaft, a locking disc on the selector shaft for engaging the notches, a plurality of additional notches on each sleeve, and means on the selector shaft for engaging the last named notches selectively.

2. A shifting mechanism comprising three shifter shafts, shifter sleeves mounted on each shaft and formed with shifting forks, a notch in two of the sleeves, a selector shaft, a locking disc on the selector shaft for engaging the notches, a plurality of notches on the two last named sleeves, means on the selector shaft for engaging the last named notches selectively, means on the selector shaft for engaging and shifting the third sleeve, and a plurality of notches on the third sleeve engageable selectively by the locking disc.

3. A shifting mechanism comprising three shifter shafts, shifter sleeves mounted on each shaft and formed with shifting forks, a notch in two of the sleeves, a selector shaft, a locking disc on the selector shaft for engaging the notches, a plurality of notches on the two last named sleeves, means on the selector shaft for engaging the last named notches selectively, a plurality of notches on the third sleeve engageable selectively by the locking disc, and a third notch on the last named sleeve engageable by the engaging means.

4. A shifting mechanism comprising a plurality of shifter shafts, a shifter sleeve mounted on each shaft for movement in either direction, a selector shaft, means on the shaft for engaging the sleeves upon predetermined rocking and sliding movement of the selector shaft to shift one of the sleeves initially to a desired position, and then select and shift another of the sleeves to a desired position.

5. A shifting mechanism comprising a plurality of shifter shafts, shifter forks carried by the shafts, a selector shaft, a selective gear shifting mechanism operated by one of the forks, a selective gear shifting mechanism driven from the first mechanism, means to control the first mechanism by one of the forks, means to control the last named mechanism by other of the forks after the last named fork has been moved to a selected position, engaging means on the selector shaft to shift a plurality of the forks selectively in a plurality of combinations to effect a plurality of speed changes, and means to move the selector shaft to engage the respective forks.

6. A shifting mechanism comprising a plurality of shifter shafts, shifter sleeves carried by the shafts, a selector shaft, a selective gear shifting mechanism operated by one of the sleeves, a selective gear shifting mechanism driven from the first mechanism, means to control one of the mechanisms from one of the sleeves, means to control the other mechanism from other of the sleeves, a notch in the sleeve controlling the first mechanism, a plurality of notches in the other sleeves, means on the selector shaft to engage the first notch, means on the selector shaft for engaging, selectively, the plurality of notches, and means to move the selector shaft to cause it to engage the notches selectively.

7. A shifting mechanism comprising a plurality of shifter shafts, shifter sleeves carried by the shafts, a selector shaft, a selective gear shifting mechanism operated by one of the sleeves, a selective gear shifting mechanism driven from the first mechanism, means to control one of the mechanisms from one of the sleeves, means to control the other mechanism from other of the sleeves, a notch in the sleeve controlling the first mechanism, a plurality of notches in the other sleeves, means on the selector shaft to engage the notches selectively to move the shifter sleeves into a plurality of positions, and means to prevent movement of one of the sleeves in one direction upon a predetermined movement of the controlling sleeve for the first mentioned mechanism.

8. A shifting mechanism comprising a plurality of shifter forks movable into a plurality of shifting positions, an additional shifter fork, a common shifting means for moving all of the forks, and means actuated by the shifting means and controlling its engagement with the first forks to shift the additional fork into a desired position before moving the first forks to perfect a plurality of shifts.

This specification signed this 30th day of November, A. D. 1928.

KEITH R. MANVILLE.